(12) United States Patent
Hall

(10) Patent No.: US 9,973,344 B2
(45) Date of Patent: *May 15, 2018

(54) SYSTEM AND METHOD FOR SCALABLE GEOGRAPHIC ADDRESSING FRAMEWORK

(71) Applicant: AT&T Intellectual Property I, L.P., Atlanta, GA (US)

(72) Inventor: Robert J. Hall, Berkeley Heights, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/497,941

(22) Filed: Apr. 26, 2017

(65) Prior Publication Data
US 2017/0230192 A1   Aug. 10, 2017

Related U.S. Application Data

(63) Continuation of application No. 15/139,695, filed on Apr. 27, 2016, now Pat. No. 9,667,432, which is a continuation of application No. 14/078,034, filed on Nov. 12, 2013, now Pat. No. 9,363,230.

(51) Int. Cl.
| | |
|---|---|
| H04L 12/18 | (2006.01) |
| H04L 12/741 | (2013.01) |
| H04W 4/06 | (2009.01) |
| H04W 12/04 | (2009.01) |

(52) U.S. Cl.
CPC .......... *H04L 12/1845* (2013.01); *H04L 45/74* (2013.01); *H04W 4/06* (2013.01); *H04W 12/04* (2013.01)

(58) Field of Classification Search
CPC combination set(s) only.
See application file for complete search history.

(56) References Cited

U.S. PATENT DOCUMENTS

| | | |
|---|---|---|
| 5,732,357 A | 3/1998 | Gayton et al. |
| 6,304,556 B1 | 10/2001 | Haas |
| 6,721,537 B1 | 4/2004 | Briesemeister |

(Continued)

OTHER PUBLICATIONS

AT&T Labs Research—Scalable Ad Hoc Wireless Geocast, "AT&T Researchers—Inventing the Science Behind the Service," downloaded from http://research.att.com/projects/Geocast/?fbid=WLxYL7rJF3p on Oct. 14, 2013, 3 pages.

(Continued)

*Primary Examiner* — Andrew Lai
*Assistant Examiner* — Andrew C Lee
(74) *Attorney, Agent, or Firm* — Chiesa Shahinian & Giantomasi PC

(57) ABSTRACT

A bridge device at a first tier receives a geographic addressing packet destined for a target region containing a plurality of devices. The bridge device applies a bridging function using the geographic address packet to determine whether to transmit the geographic addressing packet. The bridging function utilizes certain information based on the geographic addressing packet. The bridge device determines to transmit the geographic addressing packet to a second tier based on the bridging function indicating that the geographic addressing packet should be transmitted to the second tier.

20 Claims, 9 Drawing Sheets

(56) References Cited

U.S. PATENT DOCUMENTS

| | | |
|---|---|---|
| 6,816,460 B1 | 11/2004 | Ahmed et al. |
| 6,879,574 B2 | 4/2005 | Naghian et al. |
| 6,947,978 B2 | 9/2005 | Huffman et al. |
| 6,961,728 B2 | 11/2005 | Wynblatt et al. |
| 7,283,045 B1 | 10/2007 | Manz |
| 7,307,978 B2 | 12/2007 | Carlson |
| 7,573,858 B2 | 8/2009 | Roh et al. |
| 7,598,850 B2 | 10/2009 | Manz |
| 7,602,281 B2 | 10/2009 | Manz et al. |
| 7,613,467 B2 | 11/2009 | Fleischman |
| 7,639,652 B1 | 12/2009 | Amis et al. |
| 7,739,497 B1* | 6/2010 | Fink ................ H04L 29/12433 713/153 |
| 7,764,185 B1 | 7/2010 | Manz et al. |
| 7,821,994 B2 | 10/2010 | Sherman et al. |
| 7,917,169 B1 | 3/2011 | Hall |
| 8,073,903 B2 | 12/2011 | Wood et al. |
| 8,149,801 B2 | 4/2012 | Hall |
| 8,218,463 B2 | 7/2012 | Hall |
| 8,553,663 B2 | 10/2013 | Harmatos et al. |
| 9,148,373 B2 | 9/2015 | Kahng et al. |
| 9,363,230 B2* | 6/2016 | Hall ..................... H04L 61/609 |
| 9,667,432 B2* | 5/2017 | Hall ..................... H04L 12/1845 |
| 2002/0150094 A1* | 10/2002 | Cheng ................ H04L 12/185 370/389 |
| 2003/0135594 A1 | 7/2003 | Xu et al. |
| 2005/0025182 A1 | 2/2005 | Nazari |
| 2005/0096065 A1 | 5/2005 | Fleischman |
| 2006/0146820 A1 | 7/2006 | Friedman et al. |
| 2006/0153157 A1 | 7/2006 | Roh et al. |
| 2007/0037596 A1 | 2/2007 | Shaffer et al. |
| 2007/0160017 A1* | 7/2007 | Meier .................. H04W 36/18 370/338 |
| 2007/0263571 A1* | 11/2007 | Hermann ............... H04L 12/18 370/338 |
| 2009/0045977 A1 | 2/2009 | Bai et al. |
| 2009/0207773 A1* | 8/2009 | Feng .................. H04L 41/5022 370/312 |
| 2011/0081973 A1* | 4/2011 | Hall ....................... A63F 1/00 463/42 |
| 2012/0170501 A1* | 7/2012 | Drozt .................. H04W 72/005 370/312 |
| 2013/0099941 A1* | 4/2013 | Jana ..................... H04W 4/023 340/905 |
| 2013/0157692 A1 | 6/2013 | Hall et al. |
| 2013/0315102 A1* | 11/2013 | Kahng ................ H04L 61/103 370/254 |
| 2014/0038511 A1* | 2/2014 | Hall .................... H04L 12/1845 455/3.01 |

OTHER PUBLICATIONS

Geocast—Wikipedia, the free encyclopedia; downloaded on Oct. 14, 2013 from: http://en.wikipedia.org/wiki/Geocast#Geographic_addressing, 2 pages.

Robert J. Hall, "An Improved Geocast for Mobile Ad Hoc Networks," IEEE Transactions on Mobile Computing vol. 10, No. 2, pp. 1-14, Feb. 2011.

Hughes et al., "An Efficient Coverage-based Flooding Scheme for Geocasting in Mobile Ad hoc Networks," Proceedings of the 20th International Conference on Advanced Information Networking and Applications (AINA'06), vol. 1, 6 pages, Apr. 18-20, 2006.

Maihofer, "A Survey of Geocast Routing Protocols," Communications Surveys & Tutorials, IEEE, vol. 6, No. 2, pp. 32-42, Second Quarter 2004.

Muthu et al., "Dynamic Geographical Broadcast over Mobile ad Hoc networks," IJREAT International Journal of Research in Engineering & Advanced Technology, vol. 1, Issue 1, pp. 1-7, Mar. 2013.

Navas et al., "GeoCast—Geographic Addressing and Routing," Computer Science Department Rutgers, The State University, MOBICOM 97 Budapest Hungary, pp. 66-76, 1997.

Yi et al., "Scalable and Reliable Multicasting Protocols in Mobile Ad hoc Networks," University of California, Los Angeles, ProQuest, UMI Dissertations Publishing, pp. 1-186, 2004.

* cited by examiner

SYSTEM AND METHOD FOR SCALABLE GEOGRAPHIC ADDRESSING FRAMEWORK

CROSS-REFERENCE TO RELATED APPLICATIONS

This application is a continuation of U.S. patent application Ser. No. 15/139,695, filed Apr. 27, 2016, now U.S. Pat. No. 9,667,432, which is a continuation of U.S. patent application Ser. No. 14/078,034, filed Nov. 12, 2013, now U.S. Pat. No. 9,363,230, the disclosures of which are herein incorporated by reference in their entirety.

TECHNICAL FIELD

This specification relates generally to systems, methods and apparatus for Geographic Addressing (GA) and more particularly to systems, methods and apparatus for GA that are scalable to a multi-tiered environment.

BACKGROUND

In Geographic Addressing (GA), a network delivers a packet to all devices occupying a single region called a geocast region. GA is driven by the inefficiency of traditional routing schemes under conditions of high density, high mobility, or rapidly changing link topologies. GA is an efficient way to support important classes of mobile and embedded applications.

SUMMARY

In accordance with an embodiment, a bridge device at a first tier receives a geographic addressing packet destined for a target region containing a plurality of devices. The bridge device applies a bridging function using the geographic address packet to determine whether to transmit the geographic addressing packet. The bridging function utilizes certain information based on the geographic addressing packet. The bridge device determines to transmit the geographic addressing packet to a second tier based on the bridging function indicating that the geographic addressing packet should be transmitted to the second tier.

In another embodiment, the first tier includes a georouter tier including the bridge device. The bridge device communicates via a mobile communications network and a wireless network. The second tier includes a geocast tier including devices that communicate via a wireless network.

In another embodiment, the first tier includes a geocast tier including the bridge device. The bridge device communicates via a mobile communications network. The second tier includes a georouter tier including devices that communicate via a wireless network.

In another embodiment, the first tier includes a geocast tier including the bridge device. The bridge device communicates via a mobile communication network. The second tier includes a geocast tier including devices that communicate via a wireless network.

In another embodiment, the first tier includes a georouter tier including the bridge device. The bridge device communicates via a mobile communication network. The second tier includes a georouter tier including devices that communicate via a wireless network.

In another embodiment, the geographic addressing packet includes a common operating picture update that is to be distributed to a plurality of devices. The second tier includes a non-bridge device receiving the geographic addressing packet. The non-bridge device decrypts a header of the geographic addressing packet to determine whether to send geographic addressing packet including the common operating picture update to another device.

In another embodiment, it is determined to transmit the geographic addressing packet to a third tier based on the bridging function indicating that the geographic addressing packet should be transmitted to the third tier. In response to determining that the third tier is a georouter tier, the geographic addressing packet is transmitted to a georouter server that decides to send the geographic addressing packet to a second bridge device using a second function. The second bridge device connects to a fourth tier.

In another embodiment, after receipt of the geographic addressing packet at a third tier located in the target region, the geographic addressing packet is distributed by the third tier to the plurality of devices.

In another embodiment, the geographic addressing packet is secured by a shared session key encryption system administered by a field security administrator.

In another embodiment, the determination to transmit the geographic addressing packet is in response to the bridging function returning a true response.

In another embodiment, an apparatus for transmitting geographic addressing data to devices in an area includes a processor and a memory to store computer program instructions. The computer program instructions when executed on the processor cause the processor to perform the following operations. A geographic addressing packet destined for a target region containing a plurality of devices is received at a bridge device. A bridging function using the geographic address packet is applied at the bridge device to determine whether to transmit the geographic addressing packet. The bridging function utilizes certain information based on the geographic addressing packet. A determination is made by the bride device to transmit the geographic addressing packet to a second tier based on the bridging function indicating that the geographic addressing packet should be transmitted to the second tier.

In another embodiment, a computer readable medium stores computer program instructions for transmitting geographic addressing data to devices in an area. The computer program instructions, when executed on a processor, cause the processor to perform the following operations. A geographic addressing packet destined for a target region containing a plurality of devices is received at a bridge device. A bridging function using the geographic address packet is applied at the bridge device to determine whether to transmit the geographic addressing packet. The bridging function utilizes certain information based on the geographic addressing packet. A determination is made by the bride device to transmit the geographic addressing packet to a second tier based on the bridging function indicating that the geographic addressing packet should be transmitted to the second tier.

DETAILED DESCRIPTION

Figure 1:
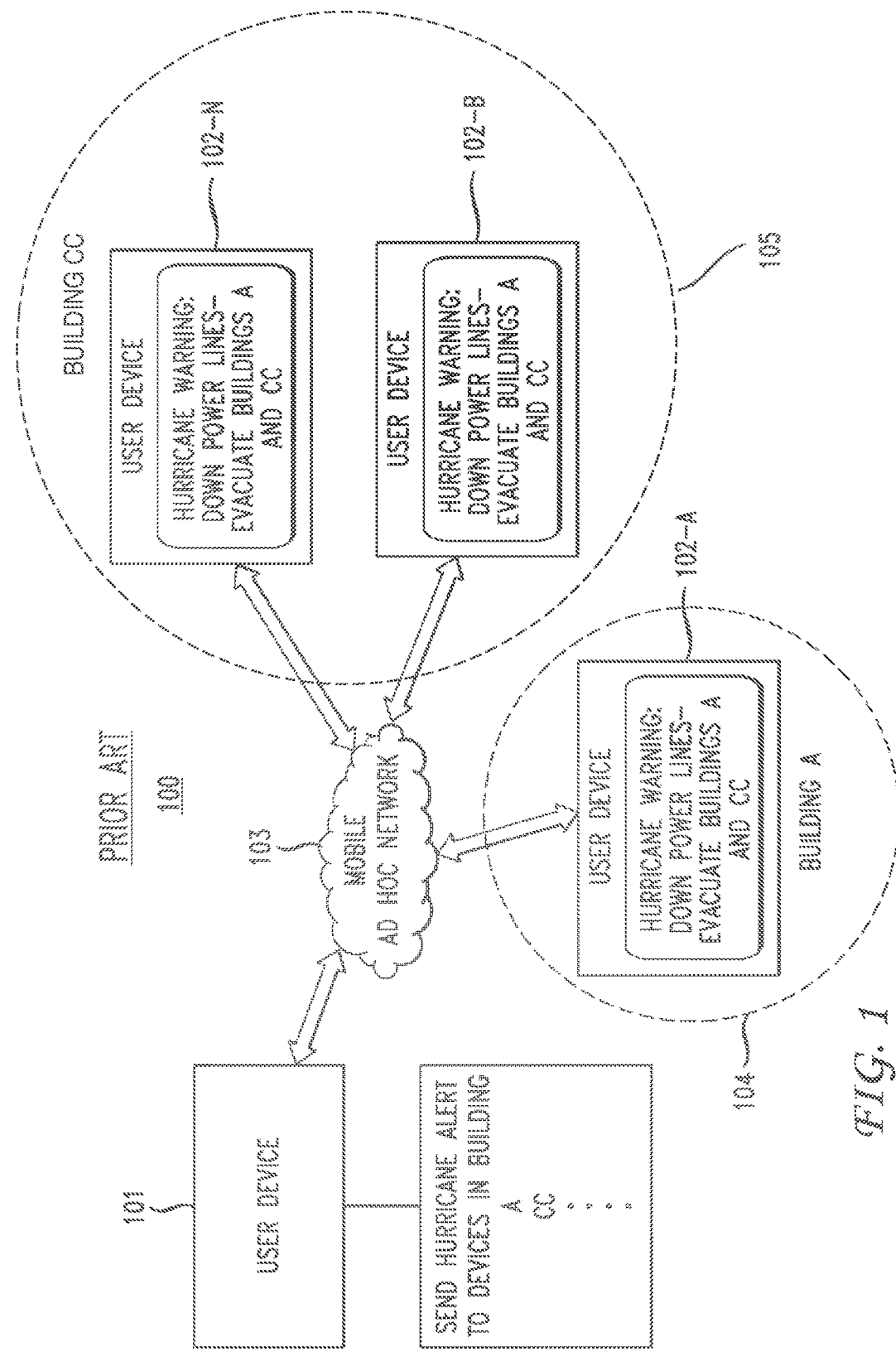
FIG. 1 illustratively depicts a prior art communication system.

FIG. 1 shows a prior art geographic addressing communication system 100, according to an embodiment. System 100 includes a user device 101, user devices 102-A, 102-B, 102-N and a mobile ad-hoc network 103. The user devices communicate with each other via network 103.

Suppose user device 101 wishes to send information using geographic addressing to multiple devices located in a particular geographic region. For example, suppose user device 101 wishes to send a hurricane alert to devices located in a geographic region which encompasses a building. User device 101 receives an indication of which geographic regions to transmit the alert to by a user. In the example of FIG. 1, user device 101 wishes to send the alert to devices located in buildings A and CC. Buildings A and CC are defined using an associated geographic location. Building A is within region 104 and building CC is within region 105. User device 101 transmits the alert by addressing the alert to regions 104 and 105 covering buildings A and CC, respectively, in respective geographically addressed messages. Mobile ad-hoc network 103 receives the alert from user device 101 and delivers the alert to region 104 which includes all devices located in building A. The ad-hoc network 103 receives the alert addressed to region 105 from user device 101 and delivers the alert to region 105 which includes all devices located in building CC. A user device 102-A is located in building A in region 104 a user device 102-B, and a user device 102-N are located in building CC in region 105. All devices within the identified regions are delivered the messages which are destined for the particular identified region.

A Scalable Geographic Addressing Framework (SGAF) is described herein. The SGAF utilizes a unique dual-tier arrangement in order to communicate data between multiple devices. The dual-tier arrangement includes a georouter tier and a geocast tier. In the embodiment depicted by FIG. 7 described below, a dual-tier arrangement is provided. In an embodiment, any number of tiers and any combination of tiers may be accommodated. The tiers may include any mixture of georouter tiers and geocast tiers.

Geocast Tier

A geocast tier provides small scale (often local) means of communicating data between devices. A geocast tier may use a wireless network such as an ad-hoc network to transmit a geographic addressing packet between devices. By using one-to-many radio-level broadcasts, better scaling efficiency of geographic addressing may be achieved as compared to a georouter tier. A geocast tier may provide a lower level of communication as compared to a georouter tier. A geocast tier provides scalability and robust operation in field conditions.

Georouter Tier

A georouter tier utilizes a schema for communicating geographic addressing packets between devices. A georouter tier may provide a higher level of communication as compared to a geocast tier. A georouter tier provides a large scale (capable of communicating beyond local systems, for example, coast to coast, globally, etc.) means of communicating data between devices.

A georouter tier may use star connectivity and require the overhead of a full Internet Protocol (IP) network. Therefore, a geocast tier may provide more robust operation in field conditions as compared to a georouter tier. Georouter tiers, on the other hand, enable GA implementation in arbitrary network types that do not admit efficient geocast style implementations, for example, due to not having one-to-many broadcast available. Additional details regarding a georouter tier will be described herein.

Figure 2:
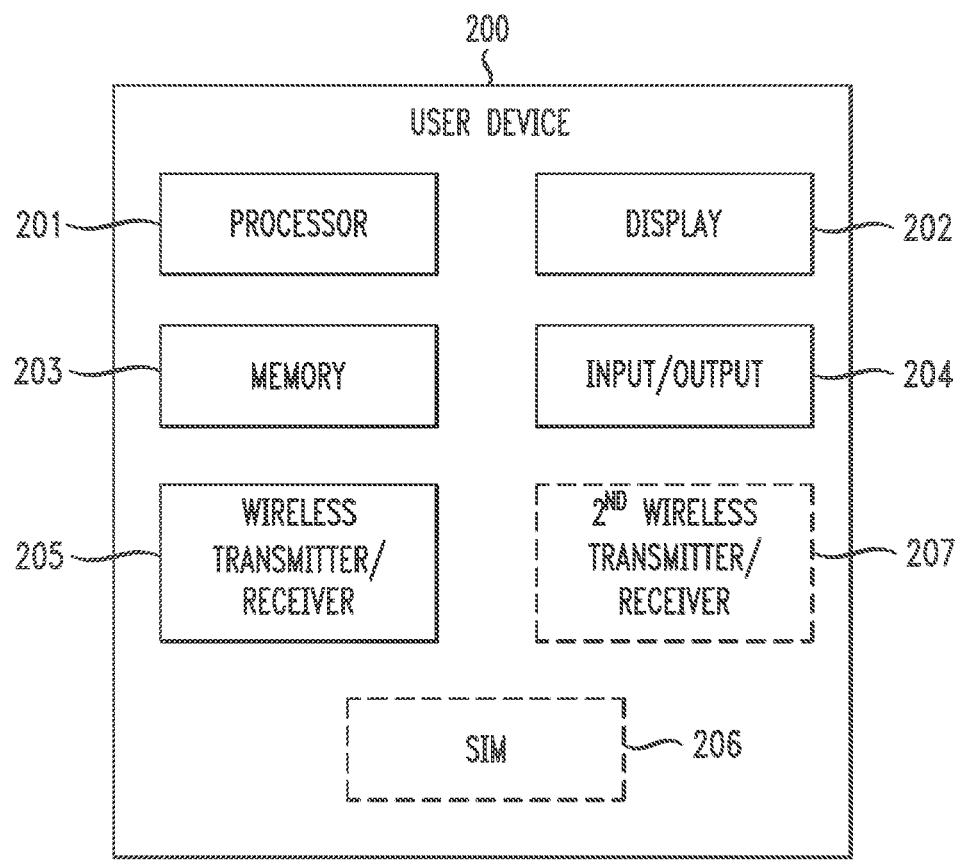
FIG. 2 illustratively depicts functional components of an exemplary user device in accordance with an embodiment.

A user device may be located in either type of tier or both. For example, a user device may be located in a georouter tier or a geocast tier or both. FIG. 2 shows functional components of a user device 200 in accordance with an embodiment. User device 200 includes a processor 201, a display 202, a memory 203, an input/output 204, a wireless transmitter/receiver 205, and optionally, a second ($2^{nd}$) wireless transmitter/receiver 207 and a Subscriber Identity Module (SIM) card 206. Display 202 displays documents, text, Short Message Service (SMS) message, images, software applications, webpages, and other information. User device 200 may connect to a wireless network such as an ad-hoc network. If the device is a Global System for Mobile Communications (GSM) compatible device, the device may subscribe to a service provider in order to connect to the Internet via a cellular/mobile communications network (i.e. GSM) or through a wireless local area network (LAN) (e.g. WiFi). Communication between user device 200 and the Internet may be established using $2^{nd}$ wireless transmitter/receiver 207 over a GSM network such as a 3G/4G/4GLTE network. SIM card 206 provides an identification of $2^{nd}$ wireless transmitter/receiver 207. Long Term Evolution (LTE) is a wireless communication standard for high speed data. Communication between user device 200 and wireless networks, such as an ad-hoc or WiFi network, may also be established using wireless transmitter/receiver 205. In the illustrative embodiment, user device 200 may be a mobile communication device such as a wireless phone, a personal digital assistant, cellular/mobile communications device, a laptop computer, a netbook, a tablet device, an electronic book reader, etc. Other examples of user device 200 include a personal computer, a laptop computer, a tablet device, a workstation, a mainframe computer, etc. Other devices may be used.

In some embodiments, user device 200 is a wireless capable device and communicates via 802.11X protocol. User device 200 may connect to the Internet using a WiFi network. User device 200 may also connect to other devices using a pier-to-pier (P2P) network where no base station is involved in an ad-hoc network.

In some embodiments, user device 200 is a GSM capable device. User device 200 may connect to the Internet using LTE. Thus, user device 200 may connect to a cellular/mobile communications data network (e.g. GSM) in order to connect to the Internet using wireless transmitter/receiver 205.

In this embodiment, wireless transmitter/receiver 205 is a baseband processor. Such a device may be used as a bridge device, described below.

In an embodiment, user device 200 may be associated with multiple tiers. For example, user device 200 may be associated with two tiers (any one or both of geocast or georouter tiers). In order for a device to be in two tiers, two wireless devices (wireless transmitter/receiver 205, and $2^{nd}$ wireless transmitter/receiver 207) may be needed. A bridge device, for example, may use two wireless devices.

In some embodiments, user device 200 may contain multiple wireless transmitter/receiver components, possibly of different types. In one embodiment, one wireless device is a WiFi chip capable of ad-hoc operation mode, while the other is a cellular data transceiver capable of operating on the GSM or LTE network. This allows, for example, a geocast tier to be accessed via the WiFi component and a georouter tier to be accessed via the GSM/LTE component.

Figure 3:
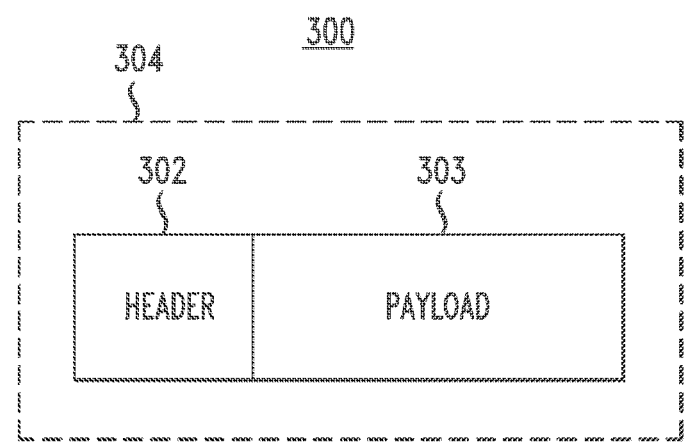
FIG. 3 illustratively depicts a geographic addressing packet in accordance with an embodiment.

FIG. 3 illustratively depicts a geographic addressing packet 300. Geographic addressing packet 300 includes a header 302 and payload 303. Header 302 may include destination information used to determine where to route packet 300. Geographic addressing packet 300 may also optionally be encapsulated within a User Datagram Protocol (UDP) packet. Encapsulation 304 is an envelope packet that includes the client's current tier footprint(s) for all tiers it has access to, as well as the IP address and UDP port number at which the client listens for packets from a Georouter Server (GRS), and its current location (e.g. expressed in latitude and longitude coordinates). A georouter tier may wrap and envelop additional information in encapsulation 304.

In Scalable Geographic Addressing Framework (SGAF), a georouter tier includes two classes of devices. A Georouter Server (GRS) is a device or scalable redundant distributed system that acts as a central database and is a dispatcher of all geographic addressing packets processed by the tier. A georouter tier also contains any number of georouter user devices, which send geographic addressing packets via the GRS. An example of a georouter tier is shown in FIG. 4.

Figure 4:
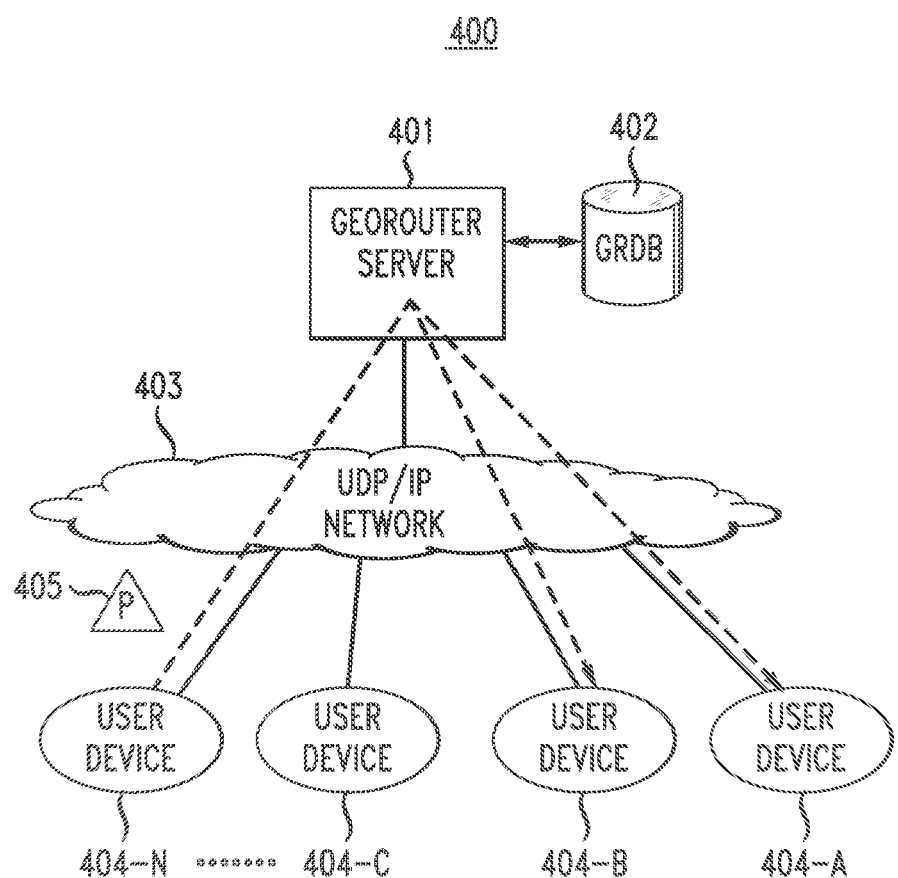
FIG. 4 illustratively depicts an example of a georouter tier in accordance with an embodiment.

FIG. 4 illustratively depicts an example of a georouter tier. A georouter tier 400 includes a georouter server 401, a georouter database (GRDB) 402, a network 403 such as a UDP/IP Network, a geographic addressing packet 405 and multiple user devices 404-A, 404-B, 404-C, . . . , 404-N.

Suppose that user device 404-N wishes to transmit geographic addressing packet 405 to user devices 404-A and 404-B. User device 404-N transmits geographic addressing packet 405 to georouter server 401 via network 403. Georouter server 401 uses a suitable instance of the georouting algorithm schema described below to decide which clients should receive copies of the geographic addressing packet. As a result of the algorithm, georouter server 401 determines to transmit the geographic addressing packet to clients 404-A and 404-B. Georouter server 401 then forwards copies to the clients over network 403.

The user devices in FIG. 4 may be bridge devices to one or more geocast tiers. Each user device and each tier accessible to that user device is associated with a tier footprint. The tier footprint is a region description that informs the GRS of the region to which the user device may be able to deliver the geographic addressing packet via other tiers. In particular, if the geocast region of a packet does not intersect any tier footprint of the client or user device, and if the user device itself is not located in the geocast region, then the GRS may conclude that it need not send the user device a copy of the packet. The tier footprints for a device are represented by a parameter, FootprintD(TierID T):Region. This parameter is a method on the client class that returns a region definition. A user device may have a footprint for either geocast type or georouter type tiers. The tier footprint of a particular user device bridged to a geocast tier can either be a static property of the user device (i.e. FootprintD(T) returns a constant), may be a fixed function of the location of the client, or it may be computed dynamically by the client. For a user device bridged to a georouter tier, the footprint would be that declared by the GRS for the tier, which is by default the union of the footprints of its clients, or a simpler geometric approximation thereto.

Georouter Client Behavior

When a geographic addressing packet is presented at a user device for processing, either from a local application or by being bridged from another tier, it is first encapsulated within a UDP packet, as shown in FIG. 3. The envelope packet is sent to the GRS via UDP/IP.

Sending this envelope packet to the GRS transmits the original geographic addressing packet for processing and also informs the GRS of the current footprint and UDP address of the user device for future packets. The GRS keeps this information in the georouting database (GRDB). It may be necessary to periodically refresh the client's UDP address in the GRDB, because client mobility can lead, in the GSM example, to client handoffs that allocate new addresses to it. In an embodiment, the GRDB may be a table indexed by user device Identification (ID). Therefore, the GRDB is arranged by user device ID and may be sorted using the user device's ID.

The GRDB is maintained overtime. The GRDB assists the GRS in determining who a packet should be routed to. The GRDB maps IP addresses, port numbers, and location of devices in the physical world.

Since devices can move out of range, lose power, or break, the GRS may not maintain an entry for a device indefinitely long after receiving any given packet from it. Instead, the GRS assumes it will receive a packet from a device within a maximum of FRESH seconds, deleting any records that age beyond that limit. If a user device has no packets to send in this time, it will send a dummy packet, which contains all the envelope information but no GA packet payload. In one embodiment, the default for FRESH is 180 seconds and can be configured as desired in a way that balances the need for fresh information with the cost of added traffic on the network.

The GRS processes a received envelope packet by executing the procedure GRSProcess, the pseudo code of which is shown below:

```
Procedure GRSProcess (EnvelopePacket E, GRDB D)
  LET S := E.senderID
  Record E.tiers, E.footprints, E.IPAddress, E.Port in D for S
  IF (E.payload is NULL) THEN RETURN
  LET P := E.payload
  FOR each tier T known to the server DO
    Let X := D.Search(P; T), which returns
      the set of all clients N such that
      GeocastRegion(P) ∩ N.footprint(T) ≠ 0
    Let Z := Select(T;X; P)
    FOR each client C ∈ Z DO
      IF C has not already been sent a copy of P THEN
        Send C a copy of P at the (IP, port)
        looked up for S within D
```

GRSProcess is executed by the GRS. GRSProcess is used to manage the GRDB and to route the geographic addressing packet. Variable "E" in the pseudo code GRSProcess above represents a received envelope packet. "GRDB D" represents a georouter database D. GRSProcess first extracts the sender's ID, IP address, port number, and declared tiers and footprints from the envelope packet. Thus, when a client (or a user device) sends a packet to GRS, "S" is the sender's ID. This information (the tiers, footprints, IP address of the sender and port number of the sender) is recorded in the GRDB for the sender, which is a table indexed by user device ID. If the payload of the geographic addressing packet "P" to be processed is NULL or empty, then the process returns because the purpose of the packet was simply to update the GRDB. If the payload of the geographic addressing packet "P" to be processed is not null, then the GRS proceeds as follows. For each known tier T, the server searches the GRDB using the GRDB method Search for the set of all known members of T whose footprints for T intersect the geocast region (and do not equal zero). It applies the Select function to possibly reduce this set for efficiency. The Select function selects which clients to send packets to. It then proceeds to send a copy of "P" to each client not already sent a copy, using the IP address and port found in the GRDB for the client.

Search can be implemented straight forwardly by a brute force linear search through the GRDB. In an alternative embodiment, the GRS may use an algorithm based on geographic sorting.

The GRSProcess utilizes the Select function. This function takes in a tier ID "T", a non-empty set of devices "X" belonging to "T", and a geographic addressing packet "P". It returns a subset of "X". The subset of "X" is the number of clients who should receive copies of the geographic addressing packet.

In an exemplary embodiment, suppose that a user of a user device wishes to send a geographic addressing packet. The user device first sends the geographic addressing packet to the GRS. GRS uses the GRSProcess to determine which clients should receive copies of the geographic addressing packet and sends copies over UDP/IP.

Figure 5:
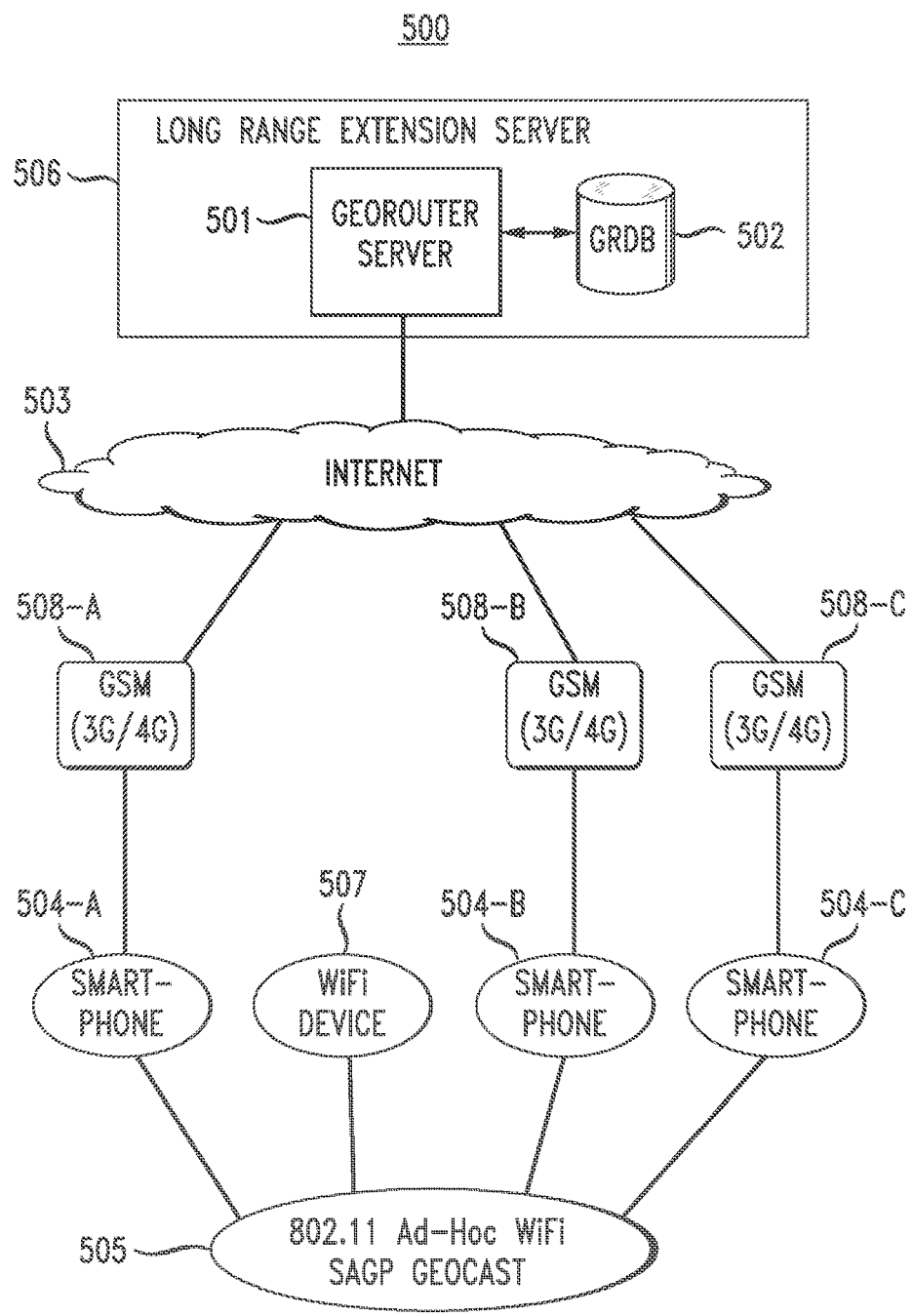
FIG. 5 illustratively depicts an exemplary multi-tiered geographic addressing system that instantiates a scalable geographic addressing framework in accordance with an embodiment.

FIG. 5 illustratively depicts an exemplary multi-tiered geographic addressing system that instantiates a scalable geographic addressing framework. System 500 depicted by FIG. 5 includes a long-range extension server 506, which includes a georouter server 501, a georouter database (GRDB) 502, the Internet 503, smartphones 504-A, 504-B and 504-C, WiFi device 507, GSM networks 508-A, 508-B and 508-C, and an 802.11 ad-hoc WiFi (SAGP) geocast 505. SAGP is the acronym for Scalable Ad-hoc Geocast Protocol. In an embodiment, SAGP is used as the geocast protocol within a geocast tier. Any or all of devices smartphones 504-A, 504-B and 504-C and WiFi device 507 may be included in a geocast tier implemented over 802.11 ad-hoc mode using the SAGP protocol. Any or all of smartphones 504-A, 504-B and 504-C that connect to Internet 503 via GSM 508-A, 508-B and 508-C, respectfully, may be included in a georouter tier. GSM capable devices (i.e. smartphones 504-A, 504-B and 504-C) can act as bridge devices. WiFi-only devices (i.e. Wifi device 507) are single-tier devices or non-bridge devices.

In the exemplary embodiment of FIG. 5, network 503 is the Internet. In other embodiments, network 503 may include one or more of a number of different types of networks, such as, for example, an intranet, a local area network (LAN), a wide area network (WAN), a wireless network, a Fiber Channel-based storage area network (SAN), or Ethernet. Other networks may be used. Alternatively, network 503 may include a combination of different types of networks.

System 500 is a multi-tier system including at least two tiers; a georouter tier and a geocast tier. The tiers include devices that occupy only one tier or the other (referred to as non-bridge devices), and bridge devices that occupy two or more tiers. Each tier enables GA within a particular network context. Power and flexibility is gained when multiple tiers work together. This is the role of bridging. A device is a bridge device if it has interfaces to more than one tier concurrently and can send a packet arriving on one of the tiers out on a different tier. For example, smartphones 504-A, 504-B and 504-C can operate on a geocast tier over its 802.11 interface, and also operate concurrently on a georouter tier using their GSM connection 508-A, 508-B, and 508-C, respectively, as shown in FIG. 5. A tier may contain all bridge devices, or it may contain both bridge devices and non-bridge devices. When a device receives a GA packet for the first time on one of its tier interfaces, it uses bridging rules to decide which, if any, of its other tiers to send the device out on. The specific bridging rules used by a given device "D" are embodied in an SGAF parameter BridgeFn$_D$. Details regarding this function are described below.

Bridging Function Rules

A bridge device can interact with multiple tiers. For example, a bridging device can interact with both types of tiers, geocast and georouter tiers or multiple instances of the same type of tier. The bridge device processes a geographic addressing packet as follows. The bridge device receives the geographic addressing packet, which includes the geocast region of the final destination of the packet and other information, the tier ID and returns a true or false boolean value (the set of which values is denoted Bool). The bride devices determine how to route a packet using bridging function rules defined as BridgeFn$_D$: (GAPkt P; TierID T; Location L)→Bool. That is, it is a function that takes the GA packet "GAPkt P", which includes the geocast region and other information, the Tier ID "TierID T" of the candidate output tier, and the device's current location "Location L", and returns true if and only if the device should send P out on the output tier.

The simplest viable bridging rule is BridgeFn$_d$=true. If and only if the bridging rule returns true, the packet continues to be transmitted and the packet is always sent out on all other tiers. Since a device will not re-process a GA packet that it has seen previously, this cannot lead to routing loops. Alternatively, as another example of possible bridging rule behavior, when a device transmits a packet on a geocast tier T and is within 1-hop coverage of the entire geocast region, it may heuristically choose not to send the device out on other tiers, because it is likely to have reached all devices in the geocast region. This may save significant processing in the other tiers.

If the bridging rule returns false, then the bridging device does not send the packet to any other tiers. Each device performs bridging function rules independently of other devices that have performed bridging functions beforehand.

Prior to applying the bridging rule, a device determines whether to apply the bridging rule by analyzing the geographic addressing packet. Specifically, a header flag is analyzed in order to make this determination. In one embodiment, if the header flag is 1, then the GA packet has already previously been sent over the georouter tier, so devices subsequently receiving it do not forward it over the georouter tier. If the flag is 0, then devices may, in accordance with other bridging rules, decide to forward it.

In an exemplary embodiment, the Scalable Geographic Addressing Framework includes the following parameters that are instantiated.

BridgeFn: A geocast tier packet is bridged to the GRS unless it contains a header flag set to indicate it has already been sent by a different device. In an embodiment, georouter tier packets are always bridged to the geocast tier processing layer upon arriving for the first time at a bridging device.

Footprint: Each bridge device has a geocast tier footprint which is a circle around its current position with radius computed from geocast region radius and nominal radio range of device. In one embodiment, the geocast tier footprint is rad+2×(RR), where rad is the geocast region radius and RR is the nominal radio range of the device.

FRESH: defaults to 180 seconds in an embodiment.

Select: If X contains fewer than or equal to 4, X is returned; otherwise, a random subset of 4 is selected.

The above version of Select describes behavior for small geocast regions, which is the case of interest for density scaling. In an alternative embodiment, for larger regions, a graph based algorithm may augment these selections by enough others to cover the larger area.

The flowcharts described in FIG. 6A and FIG. 6B described below are described using a Scalable Geographic Addressing Framework depicted by FIG. 7. Therefore, a brief description of FIG. 7 is described herein.

Figure 7:
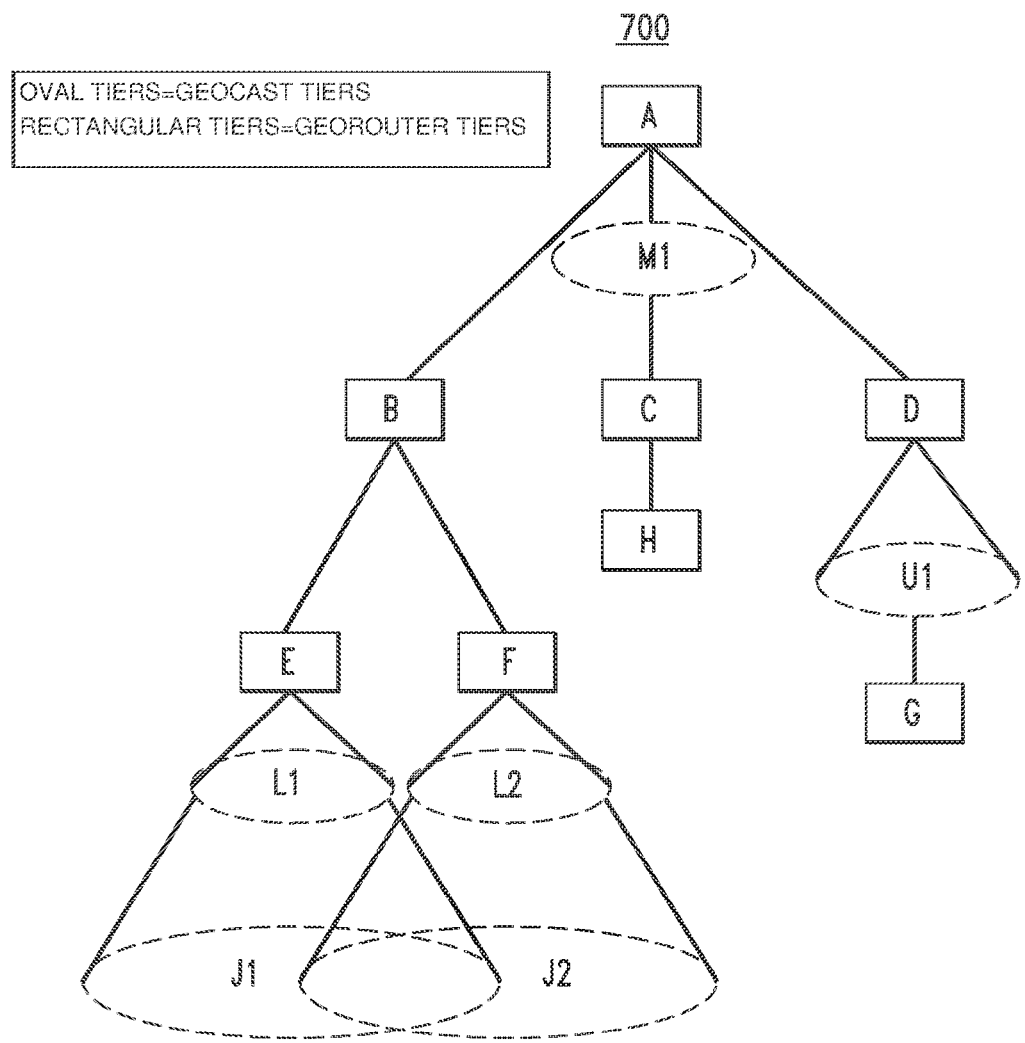
FIG. 7 illustratively depicts an instance of Scalable Geographic Addressing Framework, in accordance with an embodiment.

FIG. 7 depicts an instance of the Scalable Geographic Addressing Framework, in accordance with an embodiment. In the depicted embodiment, all oval tiers are geocast tiers and all rectangular tiers are georouter tiers. Note that in the depicted embodiment, tiers B, A, C, H, D, E, F, and G are georouter tiers and tiers M1, L1, L2, J1, J2, and U1 are geocast tiers. In alternative embodiments (not shown), any of these tiers may be georouter or geocast tiers arranged in any of a different number of ways.

In the depicted embodiment, tier A is a georouter tier that includes a bridge device, wherein the bridge device communicates via a mobile communications network and a wireless network, and the tier M1 is a geocast tier that includes devices (i.e. non-bridge devices and bridge devices or only bridge devices) that communicate via wireless network only. Georouter and geocast tiers may include all bridge devices, no bridge devices, or a combination of both bridge devices and non-bridge devices.

In one embodiment, a target region may include any combination of bridge and non-bridge devices. The target region may be defined as being encompassed within one tier or multiple tiers.

Figure 6A:
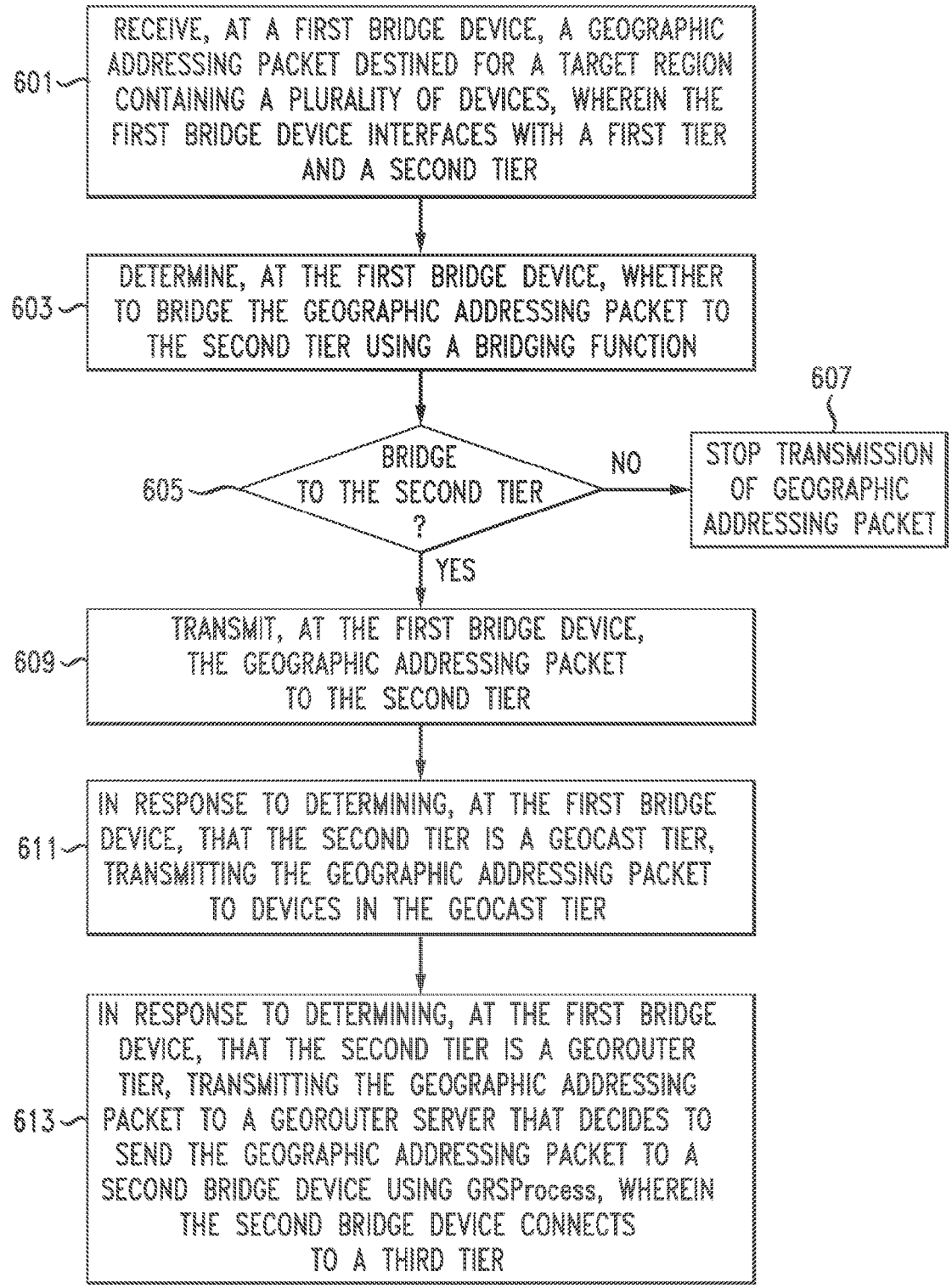
FIG. 6A illustratively depicts a flowchart of a method of utilizing a bridging function to determine whether to bridge a geographic addressing packet in accordance with an embodiment.

FIG. 6A illustratively depicts a flowchart of a method of utilizing a bridging function to determine whether to bridge a geographic addressing packet in accordance with an embodiment.

At step 601, a first bridge device receives a geographic addressing packet destined for a target region containing a plurality of devices, wherein the first bridge device interfaces with a first tier and a second tier. Referring now to FIG. 7, suppose a bridge device that interface with georouter tier D and with geocast tier U1 receives a geographic addressing packet that is destined for a target region. The target region is associated with georouter tier G and contains multiple devices within the target region.

At step 603, the first bridge device determines whether to bridge the geographic addressing packet to the second tier using a bridging function. The first bridge device determines whether to bridge the graphical addressing packet to geocast tier U1 using a bridging function. As described above, the bridging function is implemented by the first bridge device in order to make this determination.

At step 605, a decision is made whether to bridge to the second tier. The first bridge device determines whether to bridge to geocast tier U1. Based on the bridging function returning a false result, a decision of "NO" stops transmission of geographic addressing packet, as shown in step 607. The bridging device no longer transmits the geographic addressing packet in response to a NO decision to the decision box in step 605.

Based on the bridging function returning a true result, a decision of "YES" triggers the first bridge device to transmit the geographic addressing packet to the second tier, as shown in step 609. The first bridge device, in response to a YES decision to the decision box in step 605, transmits the geographic addressing packet to geocast tier U1.

At step 611, in response to determining, at the first bridge device, that the second tier is a geocast tier, the first bridge device transmits the geographic addressing packet to devices in the geocast tier. As shown in FIG. 7, suppose that the first bridge device determines that the second tier is geocast tier U1, the first bridge device transmits the geographic addressing packet to devices in geocast tier U1. The first bridge device may broadcast the geographic addressing packets to all devices within a particular range of the first bridge device (e.g. all devices that can hear or receive the packet).

At step 613, in response to determining, at the first bridge device, that the second tier is a georouter tier, the first bridge device transmits the geographic addressing packet to a georouter server that decides to send the geographic addressing packet to a second bridge device using GRSProcess, wherein the second bridge device connects to a third tier. In an embodiment, suppose that in response to determining at the first bridge device that the second tier is georouter tier U1, the first bridge device transmits the geographic addressing packet to georouter server 401 in FIG. 5. Georouter server 401 decides to send the geographic addressing packet a second bridge device (such as user device 404-C, 404-B, etc.) using GRSProcess described above. The second bridge device connects to/interfaces with a third tier as well as the second tier.

Figure 6B:
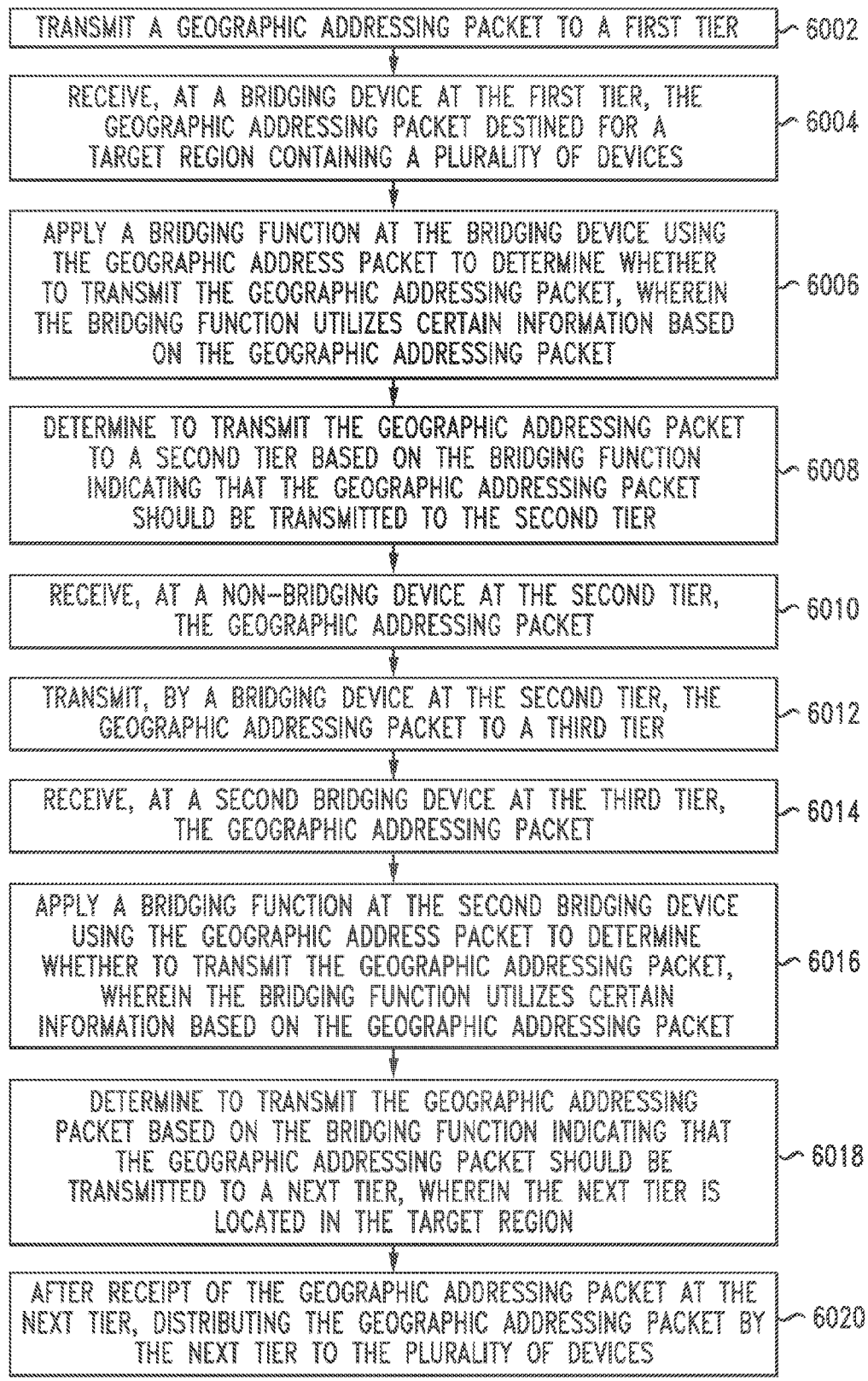
FIG. 6B illustratively depicts a flowchart of a method of delivering a geographic addressing packet destined for a target region using a scalable geographic addressing framework in accordance with an embodiment.

FIG. 6B illustratively depicts a flowchart of a method of delivering a geographic addressing packet destined for a target region using a scalable geographic addressing framework.

At step 6002, a geographic addressing packet is transmitted to a first tier. Referring now to FIG. 7, suppose that a geographic addressing packet originating at a device located in a particular region/tier is destined for a target geographic region. The geographic addressing packet is transmitted to tier A.

At step 6004, a bridge device at a first tier receives the geographic addressing packet destined for a target region containing a plurality of devices. A bridge device in tier A receives the geographic addressing packet destined for a target region located in tier H, where the target region contains multiple devices.

At step 6006, a bridging function is applied at the bridge device using the geographic addressing packet to determine whether to transmit the geographic addressing packet, wherein the bridging function utilizes certain information based on the geographic addressing packet. The information may include a geocast region, a tier footprint, an identification of the first tier, and/or a location of the bridge device. The bridge device in tier A applies a bridging function to determine how to transmit the geographic addressing packet. The bridging function utilizes the geocast region in which tier A is located in, the footprint of A, the identification of tier A, and a location of the bridge device itself to determine how to transmit the geographic addressing packet. Details regarding the bridging function rules are described above.

At step 6008, it is determined that the geographic addressing packet is to be transmitted to a second tier based on the bridging function indicating that the geographic addressing packet should be transmitted to the second tier. The bridging function utilized by the bridge device in tier A indicates that the geographic addressing packet should be transmitted to tier M1 based on the bridging function indicating that the geographic addressing packet should be transmitted to tier M1.

If the bridging function turns a true response, it is determined that the geographic addressing packet should be transmitted.

At step 6010, a non-bridge device at the second tier receives the geographic addressing packet. A non-bridge device at tier M1 receives the geographic addressing packet. The non-bridge device at tier M1 may then send the geographic addressing packet to a bridging geocast tier device.

At step 6012, the bridging geocast tier device at the second tier transmits the geographic addressing packet to a third tier. The bridging device at tier M1, after applying the bridging function, transmits the geographic addressing packet to tier C. In an embodiment, any number of relay steps among non-bridging tier-M1 devices can take place prior to reception by and processing of the packet by a bridging tier-M1 device. This flexibility is anticipated within the concept of the invention.

At step 6014, a second bridge device at the third tier receives the geographic addressing packet. A second bridge device at tier C receives the geographic addressing packet.

At step 6016, the second bridge device uses the geographic addressing packet to apply a bridging function to determine whether to transmit the geographic addressing packet. The bridging function utilizes certain information. The information is determined based on the geographic addressing packet. In another embodiment, the information may be determined based on the device itself. The information may include a tier footprint of the third tier, an identification of the third tier, and a location of the second bridge device. The bridge device in tier C applies a bridging function to determine whether to transmit the geographic addressing packet. The bridging function utilizes information that is determined based on the geographic addressing packet. The information includes the tier footprint of C, the identification of tier C, and/or a location of the second bridge device itself to determine how to transmit the geographic addressing packet. Details regarding the bridging function are described above.

At step 6018, it is determined that the geographic addressing packet is to be transmitted based on the bridging function indicating that the geographic addressing packet should be transmitted to a next tier. The next tier in this illustrative example scenario is located in the target region. The bridging function utilized by the bridge device in tier C indicates that the geographic addressing packet should be transmitted to tier H based on the bridging function indicating that the geographic addressing packet should be transmitted to tier H.

In an embodiment, bridge devices interface with two or more tiers. In an embodiment, a tier comprises a georouter tier comprising the bridge device, wherein the bridge device communicates via a mobile communications network and a wireless network. A second tier, where the geographic addressing packet is to be transmitted to, comprises a geocast tier comprising devices that communicate via a wireless network.

In another embodiment, a tier comprises a geocast tier comprising the bridge device, wherein the bridge device communicates via a mobile communications network and a wireless network. A second tier, where the geographic addressing packet is to be transmitted to, comprises a georouter tier comprising devices that communicate via a wireless network.

In another embodiment, a tier comprises a geocast tier comprising the bridge device, wherein the bridge device communicates via a mobile communication network. A second tier, where the geographic addressing packet is to be transmitted to, comprises a geocast tier comprising devices that communicate via a wireless network.

In another embodiment, a first tier comprises a georouter tier comprising the bridge device, wherein the bridge device communicates via a mobile communication network. A second tier, where the geographic addressing packet is to be transmitted to, comprises a georouter tier comprising devices that communicate via a wireless network.

In one embodiment, the bridge device in tier C is unaware that the final destination of the geographic addressing packet is in tier H. In this embodiment, when the geographic addressing packet is received by tier H and distributed to a plurality of devices in tier H, a bridging function is finally applied in order to determine that the geographic addressing packet does not need to be transmitted to any additional devices. That is, the bridging function at this final step would return a "false" response and the transmission of the geographic addressing packet to other tiers ends.

In another embodiment, the bridge device in tier C recognizes tier H (and the devices that are within tier H) to be the final destination.

In an embodiment, the devices that are to receive the geographic addressing packet may be in one or multiple tiers. Therefore, in one embodiment, the receiving devices may be within multiple tiers, and not all within a single tier. Thus, a geographic region may encompass multiple tiers having a multitude of devices, some or all of which are recipients of the geographic addressing packet that is address to a particular geographic region.

At step 6020, after receipt of the geographic addressing packet at the next tier, the next tier distributes the geographic addressing packet to the plurality of devices. The next tier overlaps with the target geographic region such that some devices within in the next tier are located within the target geographic region. The target geographic region is the region where the geographic addressing packet is addressed to be delivered to. After tier H receives the geographic addressing packet, tier H distributes the geographic addressing packet to the devices located in tier H that are also located in the geocast region. In one embodiment, the geographic addressing packet may be distributed to all or a subset of devices located in tier H. For example, the geographic addressing packet may be distributed only to selected devices located in tier H.

In an example, the target geographic region may be associated with one tier, or multiple tiers. In an embodiment where multiple tiers are included within the target geographic region, each tier would distribute the geographic addressing packet to the appropriate devices.

Many groups, such as military units and emergency responders, engage in activities involving teams of operators interacting outdoors, in field conditions. Wireless mobile computing and communications devices, such as smartphones, have the potential to save lives and increase likelihood of mission success, if the networking and other challenges inherent to large scale field operating conditions can be solved. Using the Scaleable Geographic Addressing Framework (SGAF), the real time provision of a Field Common Operating Picture (FCOP) and the capability to reliably distribute large data files to operators in the field using Field File Transfer (FFT) are provided. A common operating picture provides each operator with the locations, telemetry data, shared collaborative information, and movement histories of relevant other operators. Field file transfer allows operators to obtain and share maps, imagery, audio files, and other data necessary to safety and mission success.

Referring again to FIG. 7, suppose that the geographic addressing packet includes a common operating picture update that is to be distributed to a plurality of devices located at the destination region. When the geographic addressing packet is received by a bridge device (which may be transmitted to the bridge device by the non-bridge device) at tier M1, the bridge device decrypts a header of the geographic addressing packet to determine whether to send the geographic addressing packet including the common operating picture to another device. After decryption of the header, the bridge device may apply a bridging function in order to determine whether to further distribute the geographic addressing packet. The other device could also be a device that interfaces with the next tier, tier C. The other devices interface with both tiers M1 and C.

Referring to FIG. 7 depicting an exemplary framework instance for communicating a geographic addressing packet, suppose that a device located in/interfacing with geocast tier J1 wishes to send a geographic addressing packet to all recipients in a building located in georouter tier G. In an embodiment, the device located in geocast tier J1 is operated by a soldier. The soldier wishes to transmit data to a command post building located in georouter tier G. The device in geocast tier J1 sends a geographic addressing packet out and the geographic addressing packet is picked up by a device in J1 that is also in geocast tier L1. The device interfaces with both tiers J1 and L1. The device applies bridging rules and the bridging rules indicate that the packet is to be transmitted out to other devices in geocast tier L1. The packet is propagated to another device in geocast tier L1 that is also in georouter tier E. This other device interfaces with both tiers L1 and E. The packet is then transmitted to another device in georouter tier E that is also in georouter tier B. The packet is then transmitted to another device in georouter tier B that is also in georouter tier A. In an embodiment, georouter tier A is a global georouter tier. The device in georouter tier A will propagate via a server device the packet to a device in tier A that is also in georouter tier D. The device in georouter tier D will transmit the packet to a device located in geocast tier U1 who finally bridges to a server device in georouter tier G.

Figure 8:
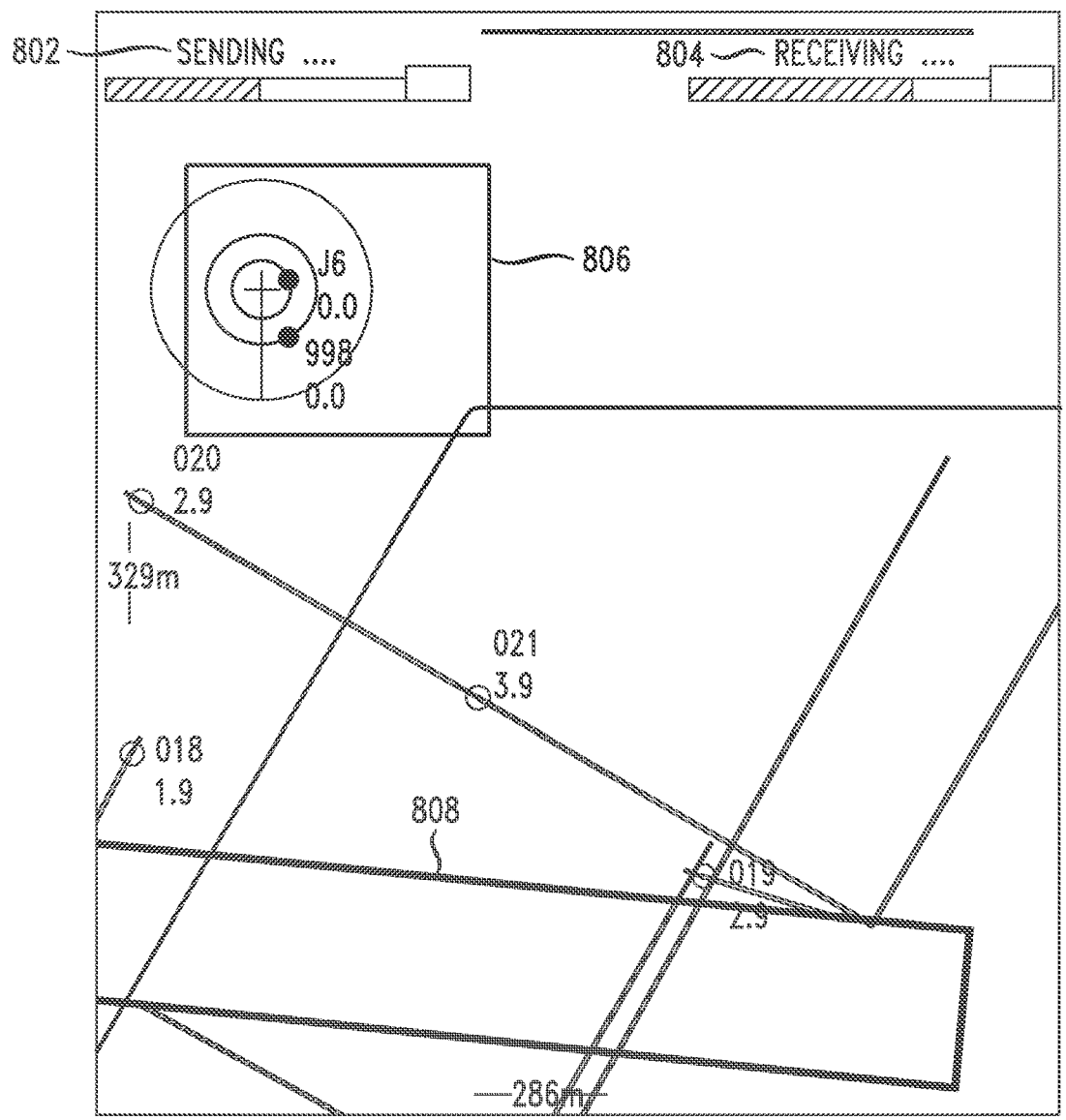
FIG. 8 illustratively depicts a screen shot of soldier coordinates in accordance with an embodiment.

The server device in georouter tier G then distributes the packet to the devices located in georouter tier G that are in the target geographic region (i.e. all recipients in a building located in georouter tier G). Suppose that the original soldier operating a device located in geocast tier J1 sends secret communication to other soldiers located in georouter tier G. The secret communication may include enemy coordinates or coordinates of other soldiers. The coordinates may be transmitted as an update to a map or a screen employed by the soldiers. FIG. 8 illustratively depicts a screen shot 800 of soldier coordinates and areas covered by certain cavalries.

Screen shot 800 in FIG. 8 may be provided to the soldiers. Screen shot 800 provides a smart phone-based FCOP display with in-progress incoming 804 and outgoing 802 file transfers. Screen shot 800 shows positions of other soldiers as well as telemetry and movement history. The positions may be color-coded (not shown) or shaded to indicate recency. Area 806 and area 808 are collaboratively defined and shared zone definitions with attached textual information. Both FCOP and FFT can be advantageously implemented using geographic addressing as a communication primitive. In FCOP, each soldier queries all devices in the monitored area of interest and, in turn, disseminates his current location and telemetry information to all soldiers in the area. Each soldier may also disseminate his current location and telemetry information to an authority in charge, such as a colonel or authorized leaders, located in a building in georouter tier G in FIG. 7. Each of these information flows is typically one-to-many and addressed geographically. In many uses of FFT, a soldier wishes to distribute the same file of information to all devices in an area because it represents information relevant to any soldier in the area. For example, a soldier distributes an area map to all soldiers in the area. Alternatively, a soldier may distribute mission relevant intelligence imagery to all soldiers in the area of operation. By using an efficient and scalable geographic addressing system, both FCOP and FFT can be more efficient than traditional algorithms (e.g. algorithms operating over IP unicast).

Field operations may require command and control from a location that may be located in the area of operation or may be at some remote command center. To support long distance monitoring and file transfers, the SGAF supports any-distance geographic addressing. This typically means that messages must traverse multiple, distinct network types. For example, a message originating at headquarters may traverse a standard IP wired network to reach a relay, at which point it may be bridged into a wireless network connecting to the devices carried by soldiers in the field.

SGAF Network Security

Network security is an important factor in SGAF. For example, in the military field, network security is crucial. It is imperative to enforce privacy of geographic addressing communications and to prevent unauthorized viewing, modification, insertion, etc. of communication by enemies, etc. In one-to-many communication system using radiolevel broadcasting, traditional one-to-one security techniques such as Virtual Private Networks (VPNs) or Transport Layer Security (TLS) protocols alone cannot be used. A sender of a geographic addressing packet may not be aware of who is receiving the packet, who will read the packet, and who will be involved in relaying the packet or the message contained within the packet. All devices (both non-bridge and bridge devices) may need to read at least the header of the packet. If the header includes potentially sensitive locations and other secret information, all devices have cryptographic keys to decrypt the header of each message. One-to-one systems use key exchange to establish distinct session keys between sender and recipient. In one embodiment, geocast tiers alone cannot implement key based network security. Georouter tiers operate by unicast messaging and therefore are capable of implementing key based network security.

Each geocast tier may be independently secured by a Field Security Administrator (FSA) who issues a shared session key to all tier devices. Therefore, the geographic addressing packet is secured by a shared session key encryption system administered by the FSA. All transmissions within the tier are encrypted in the current session key using a strong encryption standard such as Advanced Encryption Standard (AES) prior to transmission and decrypted on reception prior to processing. The FSA uses a protocol to change the session key as needed, and the FSA provisions devices with key exchange keys so that session key change can selectively cut out compromised devices.

Each georouter tier may be independently secured by keys managed by the GRS. A georouter tier is secured using VPN. In one implementation, a VPN tunnel is maintained between the GRS and each client. All UDP/IP packets are handled within the VPN encryption, and VPN standards provide authenticity, integrity, and privacy. Each bridge device has security credentials for each tier that is in communication with the bridge device and participates in distribution of the geographic addressing packet.

Each bridge device, being a trusted member of each of its tiers, bridges security domains. That is, it decrypts each GA packet on receipt from one tier and then encrypts it in the necessary form for the tier onto which it is to be bridged. This separation both eliminates the need for a global key certification authority and has the flexibility to allow GA packets to flow from any sender to recipients in any other connected security domain.

In an embodiment, a best effort approach is taken when delivering a geographic addressing packet, similar to UDP. Acknowledge requests may be requested and the sender may receive an acknowledgement back, where the acknowledgement is sent as a geocast packet.

In an embodiment, additional layering may be performed and a geographic addressing packet may be filtered prior to distribution to multiple devices. For example, only participating devices may receive the geographic addressing packet where the participating device are registered with a secure system. In other examples, suppose that only firefighters in a particular geographic region may receive a geographic addressing packet. An additional layer may be placed on top of the packet to indicate that the packet is to be transmitted to firefighters in a region only.

In various embodiments, the method steps described herein, including the method steps described in FIG. 6A and FIG. 6B, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 6A and FIG. 6B. Certain steps of the methods described herein, including one or more of the steps of FIG. 6A and FIG. 6B, may be performed by a server or by another processor in a network-based cloud-computing system. Certain steps of the methods described herein, including one or more of the steps of FIG. 6A and FIG. 6B, may be performed by a client computer in a network-based cloud computing system. The steps of the methods described herein, including one or more of the steps of FIG. 6A and FIG. 6B, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 6A and FIG. 6B, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
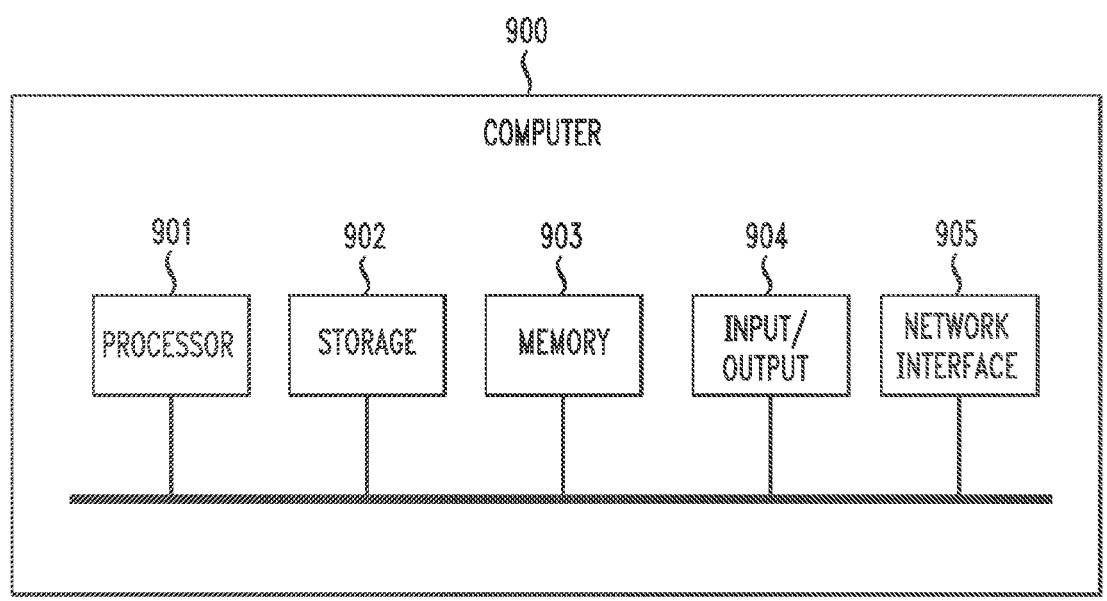
FIG. 9 illustratively depicts components of a computer that may be used to implement the invention.

A high-level block diagram of an exemplary computer that may be used to implement systems, apparatus and methods described herein is illustrated in FIG. 9. Computer 900 includes a processor 901 operatively coupled to a data storage device 902 and a memory 903. Processor 901 controls the overall operation of computer 900 by executing computer program instructions that define such operations. The computer program instructions may be stored in data storage device 902, or other computer readable medium, and loaded into memory 903 when execution of the computer program instructions is desired. Thus, the method steps of FIG. 6A and FIG. 6B can be defined by the computer program instructions stored in memory 903 and/or data storage device 902 and controlled by the processor 901 executing the computer program instructions. For example, the computer program instructions can be implemented as computer executable code programmed by one skilled in the art to perform an algorithm defined by the method steps of FIG. 6A and FIG. 6B. Accordingly, by executing the computer program instructions, the processor 901 executes an algorithm defined by the method steps of FIG. 6A and FIG. 6B. Computer 900 also includes one or more network interfaces 904 for communicating with other devices via a network. Computer 900 also includes one or more input/output devices 905 that enable user interaction with computer 900 (e.g., display, keyboard, mouse, speakers, buttons, etc.).

Processor 901 may include both general and special purpose microprocessors, and may be the sole processor or one of multiple processors of computer 900. Processor 901 may include one or more central processing units (CPUs), for example. Processor 901, data storage device 902, and/or memory 903 may include, be supplemented by, or incorporated in, one or more application-specific integrated circuits (ASICs) and/or one or more field programmable gate lists (FPGAs).

Data storage device 902 and memory 903 each include a tangible non-transitory computer readable storage medium. Data storage device 902, and memory 903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 905 may include peripherals, such as a printer, scanner, display screen, etc. For example, input/output devices 905 may include a display device such as a cathode ray tube (CRT) or liquid crystal display (LCD) monitor for displaying information to the user, a keyboard, and a pointing device such as a mouse or a trackball by which the user can provide input to computer 900.

Any or all of the systems and apparatus discussed herein, including user device 101, user device 102-A, user device 102-B, user device 103-N, georouter server 401, GRDB 402, user device 404-A, user device 404-B, user device 404-C, user device 404-N, smartphone 504-A, smartphone 504-B, smartphone 504-C, Wifi Device 507, long range extension server 506, georouter server 501, and GRDB 502 user device 200 and components thereof including processor 201, memory 203, display 202, input/output 204, wireless transmitter/receiver 205, 2$^{nd}$ wireless transmitter/receiver 207, and SIM card 206 may be implemented using a computer such as computer 900.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:
   receiving, at a first tier of a network, a geographic addressing packet destined for a target region, the target region comprising a plurality of devices;
   determining, by a bridge device at the first tier, to send the geographic addressing packet to a second tier of the network based on a result of a bridging function determined using information associated with the geographic addressing packet;
   determining whether the second tier is a geocast tier or a georouter tier;
   in response to determining that the second tier is a geocast tier, transmitting the geographic addressing packet to the second tier, wherein after receipt of the geographic addressing packet at the second tier, the second tier distributes the geographic address packet to the plurality of devices; and
   in response to determining that the second tier is a georouter tier, transmitting the geographic addressing packet to a georouter server, wherein the georouter server sends the geographic addressing packet to a bridge device at the second tier.

2. The method of claim 1, wherein the geographic addressing packet comprises a common operating picture update to be distributed to the plurality of devices.

3. The method of claim 1, wherein the information associated with the geographic addressing packet comprises at least one of a geocast region, a tier footprint, an identification of the first tier, and a location of the bridge device.

4. The method of claim 1, wherein the first tier is a georouter tier comprising the bridge device, wherein the bridge device communicates via a mobile communications network and a wireless network, and the second tier is the geocast tier comprising devices that communicate via a wireless network.

5. The method of claim 1, wherein the first tier is a geocast tier comprising the bridge device, wherein the bridge device communicates via a mobile communications network, and the second tier is the georouter tier comprising devices that communicate via a wireless network.

6. The method of claim 1, wherein the first tier is a second geocast tier comprising the bridge device at the first tier, wherein the bridge device at the first tier communicates via a mobile communication network, and the second tier is the geocast tier comprising devices that communicate via a wireless network.

7. The method of claim 1, wherein the first tier is a second georouter tier comprising the bridge device of the first tier, wherein the bridge device of the first tier communicates via a mobile communication network, and the second tier is the georouter tier comprising devices that communicate via a wireless network.

8. The method of claim 1, wherein determining to send the geographic addressing packet to a second tier of the network comprises:
   decrypting a header of the geographic addressing packet to determine to send the geographic addressing packet to the second tier.

9. The method of claim 1, wherein the geographic addressing packet is secured by a shared session key encryption system administered by a field security administrator.

10. A bridge device, comprising:
   a processor; and
   a memory to store computer program instructions, the computer program instructions when executed on the processor cause the processor to perform operations comprising:
      receiving, at a first tier of a network, a geographic addressing packet destined for a target region, the target region comprising a plurality of devices;

determining, by a bridge device at the first tier, to send the geographic addressing packet to a second tier of the network based on a result of a bridging function determined using information associated with the geographic addressing packet;

determining whether the second tier is a geocast tier or a georouter tier;

in response to determining that the second tier is a geocast tier, transmitting the geographic addressing packet to the second tier, wherein after receipt of the geographic addressing packet at the second tier, the second tier distributes the geographic address packet to the plurality of devices; and in response to determining that the second tier is a georouter tier, transmitting the geographic addressing packet to a georouter server, wherein the georouter server sends the geographic addressing packet to a bridge device at the second tier.

11. The bridge device of claim 10, wherein the geographic addressing packet comprises a common operating picture update to be distributed to the plurality of devices.

12. The bridge device of claim 10, wherein the information associated with the geographic addressing packet comprises at least one of a geocast region, a tier footprint, an identification of the first tier, and a location of the bridge device.

13. The bridge device of claim 10, wherein the first tier is a georouter tier comprising the bridge device, wherein the bridge device communicates via a mobile communications network and a wireless network, and the second tier is the geocast tier comprising devices that communicate via a wireless network.

14. The bridge device of claim 10, wherein the first tier is a geocast tier comprising the bridge device, wherein the bridge device communicates via a mobile communications network, and the second tier is the georouter tier comprising devices that communicate via a wireless network.

15. A computer readable storage device storing computer program instructions for transmitting geographic addressing data to devices in an area, which, when executed on a processor, cause the processor to perform operations comprising:

receiving, at a first tier of a network, a geographic addressing packet destined for a target region, the target region comprising a plurality of devices;

determining, by a bridge device at the first tier, to send the geographic addressing packet to a second tier of the network based on a result of a bridging function determined using information associated with the geographic addressing packet;

determining whether the second tier is a geocast tier or a georouter tier;

in response to determining that the second tier is a geocast tier, transmitting the geographic addressing packet to the second tier, wherein after receipt of the geographic addressing packet at the second tier, the second tier distributes the geographic address packet to the plurality of devices; and in response to determining that the second tier is a georouter tier, transmitting the geographic addressing packet to a georouter server, wherein the georouter server sends the geographic addressing packet to a bridge device at the second tier.

16. The computer readable storage device of claim 15, wherein the geographic addressing packet comprises a common operating picture update to be distributed to the plurality of devices.

17. The computer readable storage device of claim 15, wherein the first tier is a first second geocast tier comprising the bridge device at the first tier, wherein the bridge device at the first tier communicates via a mobile communication network, and the second tier is the geocast tier comprising devices that communicate via a wireless network.

18. The computer readable storage device of claim 15, wherein the first tier is a second georouter tier comprising the bridge device of the first tier, wherein the bridge device of the first tier communicates via a mobile communication network, and the second tier is the georouter tier comprising devices that communicate via a wireless network.

19. The computer readable storage device of claim 15, wherein determining to send the geographic addressing packet to a second tier of the network comprises:

decrypting a header of the geographic addressing packet to determine to send the geographic addressing packet to the second tier.

20. The computer readable storage device of claim 15, wherein the geographic addressing packet is secured by a shared session key encryption system administered by a field security administrator.

* * * * *

UNITED STATES PATENT AND TRADEMARK OFFICE
CERTIFICATE OF CORRECTION

PATENT NO. : 9,973,344 B2
APPLICATION NO. : 15/497941
DATED : May 15, 2018
INVENTOR(S) : Robert J. Hall Page 1 of 1

It is certified that error appears in the above-identified patent and that said Letters Patent is hereby corrected as shown below:

In the Claims

Claim 17, Column 20, Line 24, "wherein the first tier is a first second geocast tier" should read --wherein the first tier is a second geocast tier--

Signed and Sealed this
Tenth Day of July, 2018

Andrei Iancu
*Director of the United States Patent and Trademark Office*